(12) United States Patent
Kadokawa

(10) Patent No.: US 6,661,627 B1
(45) Date of Patent: Dec. 9, 2003

(54) MAGNETIC RECORDING DEVICE, METHOD OF ADJUSTING MAGNETIC HEAD, AND MAGNETIC RECORDING MEDIUM

(75) Inventor: Kouichi Kadokawa, Niihama (JP)

(73) Assignee: Matsushita Electric Industrial Co., Ltd. (JP)

( * ) Notice: Subject to any disclaimer, the term of this patent is extended or adjusted under 35 U.S.C. 154(b) by 126 days.

(21) Appl. No.: 09/856,783

(22) PCT Filed: Aug. 14, 2000

(86) PCT No.: PCT/JP00/05460

§ 371 (c)(1),
(2), (4) Date: May 25, 2001

(87) PCT Pub. No.: WO01/29831

PCT Pub. Date: Apr. 26, 2001

(30) Foreign Application Priority Data

Oct. 19, 1999 (JP) .......................................... 11-296043

(51) Int. Cl.$^7$ ................................................. G11B 5/39
(52) U.S. Cl. ................................. 360/327.3; 360/324.12
(58) Field of Search ............................. 360/313, 324.1, 360/324.11, 324.12, 324.2, 327, 327.3, 327.31, 327.33

(56) References Cited

U.S. PATENT DOCUMENTS

| | | | | |
|---|---|---|---|---|
| 4,141,051 A | * | 2/1979 | Kuijk et al. ................ | 360/322 |
| 5,159,511 A | * | 10/1992 | Das ........................ | 360/327.33 |
| 5,748,414 A | * | 5/1998 | Kim et al. ............. | 360/327.33 |
| 6,025,979 A | * | 2/2000 | Yamane et al. .......... | 360/324.1 |
| 6,144,524 A | * | 11/2000 | Haratani et al. ....... | 360/324.12 |

FOREIGN PATENT DOCUMENTS

| | | |
|---|---|---|
| JP | 61-213781 | 9/1986 |
| JP | 3-260906 | * 11/1991 |
| JP | 4-26907 | 1/1992 |
| JP | 6-314417 | 11/1994 |
| JP | 9-81916 | 3/1997 |

* cited by examiner

Primary Examiner—David L. Ometz
(74) Attorney, Agent, or Firm—Parkhurst & Wendel, L.L.P.

(57) ABSTRACT

A fixed magnetic recording device which can suppress dispersions appearing, upon manufacturing, on an effective track width and a longitudinal bias magnetic field of a magnetic head using a hard bias system. A magnetic recording device, which includes a magnetic head using a hard bias system, the head having a hard magnetic film (3) for adding a magnetic field in a longitudinal bias direction to a magnetic resistance film (1) and for controlling a magnetic domain, is characterized in that the hard magnetic film (3) includes a solenoid (4) for adjusting a magnetic field running in a longitudinal bias direction. Thus, it is possible to make fine adjustments on a magnetic field in a longitudinal bias direction and to maintain an optimum value. Consequently, it is possible to improve the linear response of a reproducing output of the magnetic head and to adjust an effective track width of the magnetic head.

8 Claims, 8 Drawing Sheets

FIG. 7
(a)
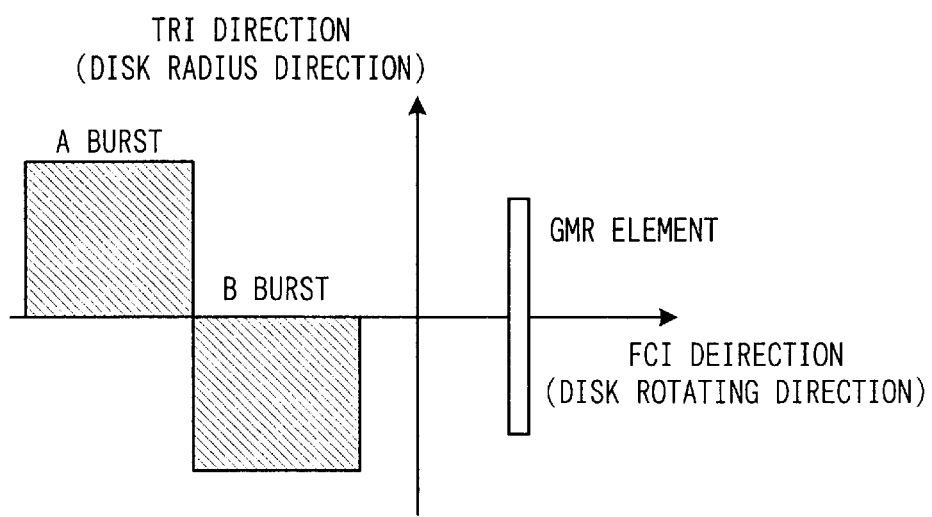
(b)
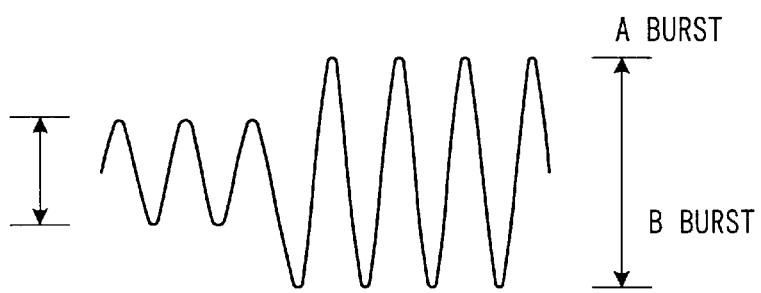

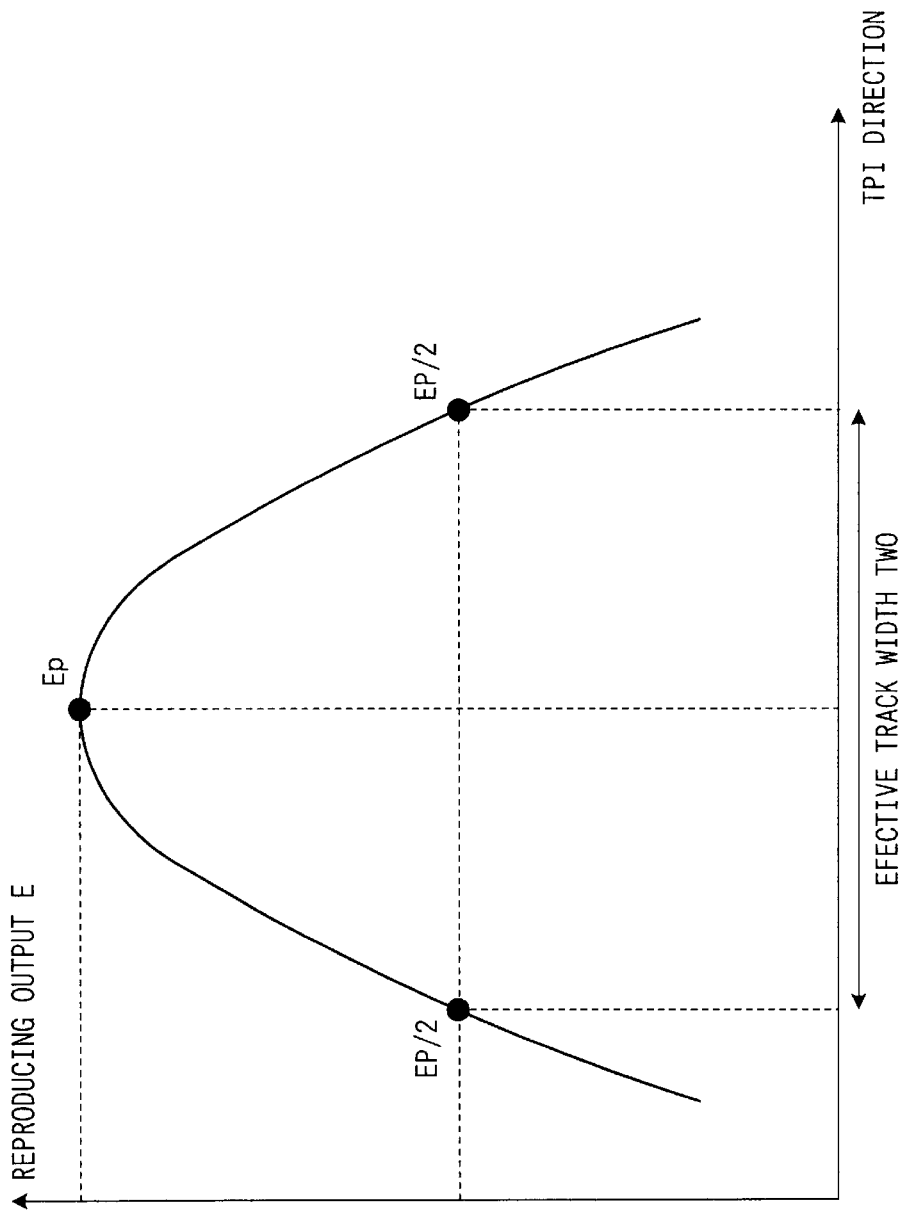

MAGNETIC RECORDING DEVICE, METHOD OF ADJUSTING MAGNETIC HEAD, AND MAGNETIC RECORDING MEDIUM

TECHNICAL FIELD

The present invention relates to a fixed magnetic recording device, a method of adjusting a magnetic head, and a magnetic recording medium in electronic equipment.

BACKGROUND ART

In recent years, regarding a fixed magnetic recording device, a faster read/write characteristic has been required as a large recording density has been further demanded every year. A reproducing system needs a higher sensitivity to a magnetic flux than ever before. Currently, in many cases, a magnetoresistive head (MR head) is adopted, in which a reproducing output does not depend upon a peripheral speed of a magnetic recording medium. Namely, a head of a reproducing method using so-called magnetoresistance is adopted, in which an external magnetic field changes its electrical resistance. In the future, the trend is expected to shift to a GMR head, whose reproducing efficiency is improved by allowing a multilayer film to form a sensor for sensing a magnetic flux.

As the GMR head for practical use, a spin valve film head is applicable, in which a spin valve is used as a multilayer film serving as a magnetic sensing part. The GMR/inductive combined head is configured such that data is written using a conventional thin film head and data is read by using the GMR head, which is disposed next to the thin film head. Namely, the GMR head is used for only reading and is characterized by reducing the influence of the adjacent track when reading, because an obtained reproducing output is considerably larger than that of the thin film head, the reproducing output does not depend upon a peripheral speed of a magnetic disk, and a reading track width is smaller than that of the thin film head for writing. For this reason, the GMR head has been widely adopted as an HDD head. However, since the GMR head requires bias current according to its operating principle, it is necessary to prevent deformation on a waveform of a reproducing signal by optimally controlling bias current.

Incidentally, when the GMR head such as the above spin valve film head, which uses a multilayer film as a magnetic sensing part, is put into practical use, the most important challenge is to positively form single magnetic domains of NiFe, which forms a free-side magnetic film. If single magnetic domains are not formed on the free-side magnetic film, an external magnetic field causes variations on a waveform that is called Barkhausen noise, resulting in signal noise. When single magnetic domains are formed on the free-side magnetic film, Barkhausen noise is eliminated and preferable reproducing output can be obtained. As a method of forming single magnetic domains on a magnetic film, a method of disposing a magnetic domain control film on an end of a magnetic film is available. As for the magnetic domain control film, it is possible to use exchange coupling of an antiferromagnetic film and to form single magnetic domains by using a magnetic field (hard bias method) of a permanent magnet. Therefore, it is understood that materials and the configuration of the magnetic domain control film are the most significant for developing a spin valve film head.

However, in case of forming a head using a hard bias method, a magnet has been formed more precisely because a track pitch has been decreased every year. Thus, dispersion in lots is not ignorable that are resulted from difficult process control. Further, when the magnet is too strong, the GMR near the magnet is dead. However, once a permanent magnet is installed in a process of forming a thin film, modification cannot be made. Hence, under present circumstances, when an actual track width of a reproducing head is largely shifted from a design center at shipment inspection, the reproducing head is selected and discarded as a faulty component. Therefore, it is necessary to develop a technique for making fine adjustments on a track width.

The present invention is devised to solve the above problem. The object is to obtain a preferable reproducing output and to make fine adjustments on a track width when an actual track width is shifted from a design value, in a magnetic head using a hard bias system.

DISCLOSURE OF INVENTION

In order to solve the above problem, on a magnetic head including a multilayer film having a hard magnetic film (hard bias film) for adding a magnetic field on a magnetic resistant film in a longitudinal bias direction, the present invention further includes a solenoid on the hard bias film and controls the magnetic field in the longitudinal bias direction by means of current applied to the solenoid.

With this configuration, even when some dispersions are found on the hard bias film in a head process, it is possible to change the strength of the hard bias film by adjusting an amount of current applied to the solenoid, and an effective track width can be variable in size. Hence, it is possible to operate a reproducing head at a point having the best reproducing output on a magnetization curve or to adjust an effective track width even after manufacturing the reproducing head. Consequently, it is possible to improve a yield and to increase reliability of a drive by absorbing dispersions appearing when the head is manufactured. Further, linear responsiveness can be improved.

A magnetic recording device of the present invention, which includes a magnetic head using a hard bias system, the head having a hard bias film for adding a magnetic field to a magnetic resistance film in a longitudinal bias direction and for controlling a magnetic domain, is characterized in that the hard bias film includes a solenoid for adjusting the magnetic field running in a longitudinal bias direction. With this configuration, the magnetic field in a longitudinal bias direction can be kept at an optimum value. Thus, it is possible to improve linear responsiveness on a reproducing output of the magnetic head and to operate the magnetic head at a point having the best reproducing output on a magnetization curve. Therefore, even when the hard bias film has a dimensional deviation, the film being formed in a process of manufacturing the head, or in the event of dispersions in strength of a magnet, it is possible to bring the magnetic head to a stable operating point. Further, it is possible to adjust an effective track width of the magnetic head and to modify the effective track width in response to the influence of dispersions in size caused during manufacturing, a skew angle, a head flying height or the like.

Moreover, the present invention is characterized by further including a current generating circuit near the magnetic head to generate longitudinal bias current supplied to the solenoid. Thus, noise of reproducing output can be prevented.

Also, the present invention is characterized in that current control means for controlling longitudinal bias current supplied to the solenoid is used as a wiring pattern and is placed on a suspension of the magnetic head. Hence, a line for controlling longitudinal bias can be further provided.

Additionally, the current control means for controlling longitudinal bias current supplied to the solenoid is characterized by including a measuring section for measuring an effective track width of the magnetic head, a computing and determining section which computes a difference between a design value and a measured value and determines a current value based on the computation result, and a current adjusting section for adjusting current supplied to the solenoid in such a manner as to obtain a value determined by the computing and determining section.

A method of adjusting the magnetic head of the present invention is such that the magnetic head of a hard bias system having a hard bias film for adding a magnetic field to a magnetic resistance film in a longitudinal bias direction and for controlling a magnetic domain, is characterized by controlling current supplied to the solenoid provided on the hard bias film so as to improve the linear responsiveness of the reproducing output of the magnetic head by means of a magnetic field appearing on the solenoid. With this configuration, it is possible to operate the magnetic head at a point having the best reproducing output on a magnetization curve.

Also, the present invention is characterized in that since control is exercised on the current supplied to the solenoid provided on the hard bias film, a reproducing inert region of the magnetic head is increased or decreased by means of a magnetic field appearing on the solenoid, and an effective track width is varied. With this configuration, it is possible to cancel dispersions in effective track width resulted from the influence of dispersions in size upon manufacturing, a skew angle, a head flying height, or the like. Thus, it is possible to eliminate defects on the head which are caused by a shift of the effective track width.

It is also possible to obtain a constant effective track width.

Further, the present invention is characterized in that an effective track width of the magnetic head is measured by measuring means, a current value supplied to the solenoid is determined by computing and determining means based on the measured value and a design value, and the current is controlled by the current adjusting section to obtain a determined current value.

A magnetic recording medium of the present invention is characterized by including executing means for performing a series of operations of measuring an effective track width of the magnetic head by means of the measuring means, determining a current value, which is supplied to the solenoid, by means of the computing and determining means based on a measured value and a design value, and controlling current by means of the current adjusting means to obtain a determined current value. With this configuration, when the magnetic head shifts to a desired track of the magnetic recording medium, the executing means is read out and the series of operations are carried out. Thus, the effective track width of the magnetic head is adjusted.

BRIEF DESCRIPTION OF DRAWINGS

FIGS. 7(a,b) show a wave form chart showing that the reproducing head reads servo information; and FIG. 8 is a reproducing output characteristic diagram showing that the reproducing head shifts in a TPI direction.

BEST MODE FOR CARRYING OUT THE INVENTION

Referring to drawings, the following will describe the detail of the embodiments of the present invention.

Embodiment 1

Figure 1:
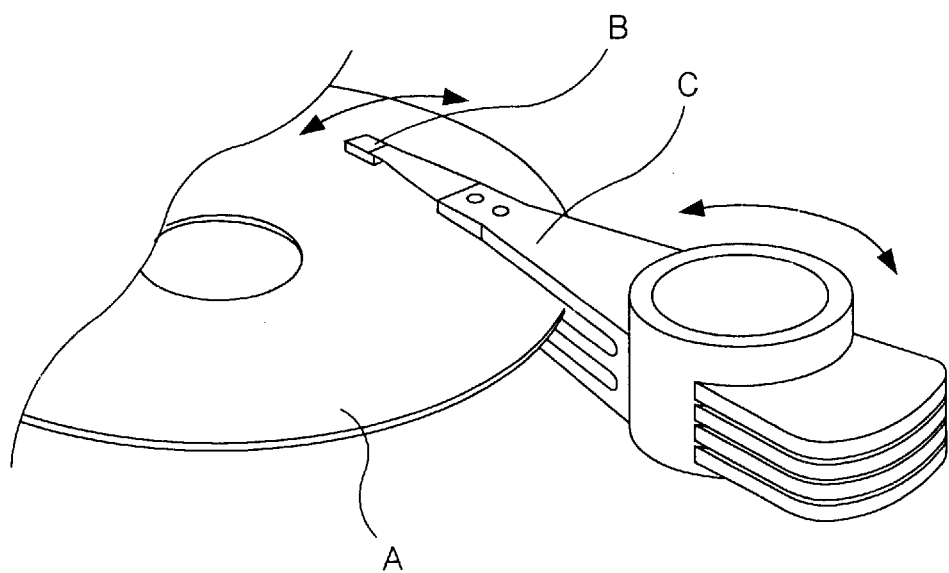
FIG. 1 is a whole structural drawing schematically showing a magnetic recording device according to Embodiment 1 of the present invention.
Figure 2:
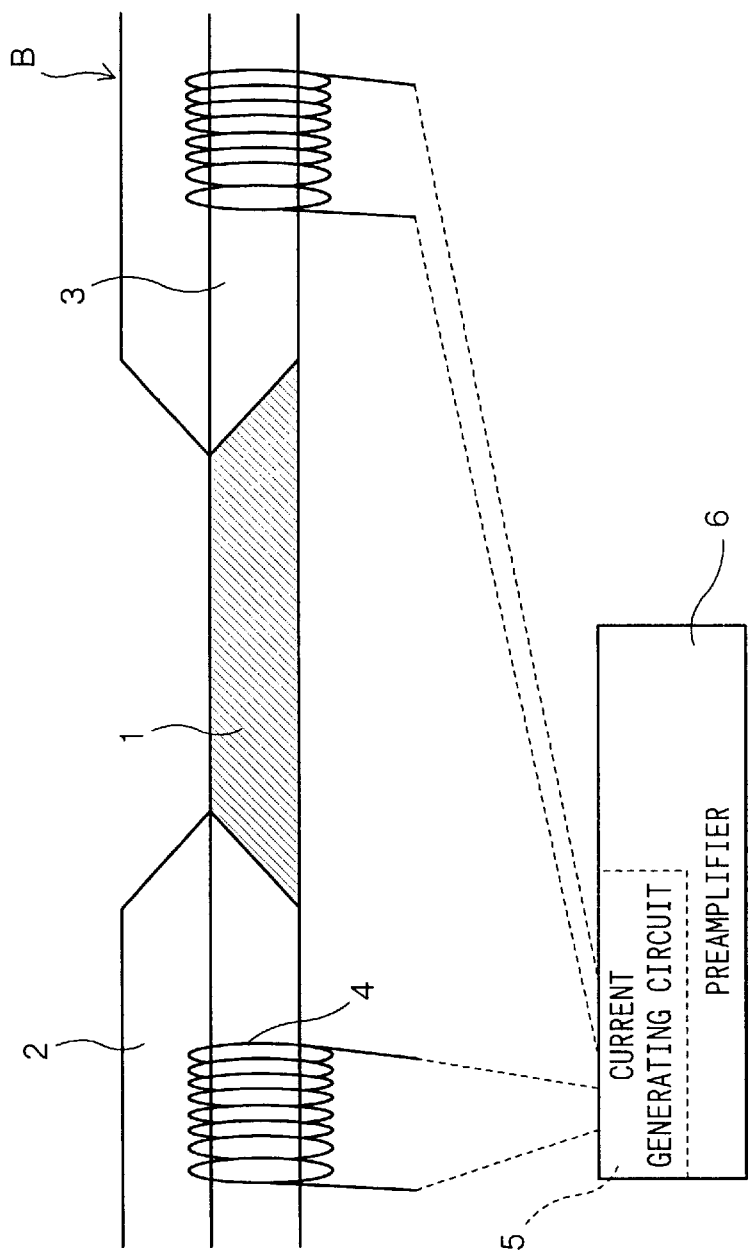
FIG. 2 is a structural drawing showing a reproducing head of the magnetic recording device shown in FIG. 1.

FIG. 1 shows a schematic configuration of a magnetic recording device according to Embodiment 1 of the present invention. FIG. 2 shows a configuration of a magnetic sensing part of a magnetic head (hereinafter, referred to as a reproducing head) of the magnetic recording device. In FIG. 1, reference character A denotes a magnetic recording medium, reference character B denotes a reproducing head, and reference character C denotes a suspension which supports the reproducing head B from a device body. Further, in FIG. 2, reference numeral 1 denotes a magnetic resistance film (an MR film or a spin valve film) which detects a change of a magnetic field from the magnetic recording medium and obtains a reproducing output, reference numeral 2 denotes an electrode for transmitting a signal of the magnetic resistance film 1, and reference numeral 3 denotes a hard magnetic film which is disposed on both ends of the magnetic resistance film 1 along its longitudinal direction and applies a magnetic field in its longitudinal direction to suppress Barkhausen noise. A material such as NiFe is often used for the magnetic resistance film 1, and a material such as CoCrPt is often used for the hard magnetic film 3.

Figure 3:
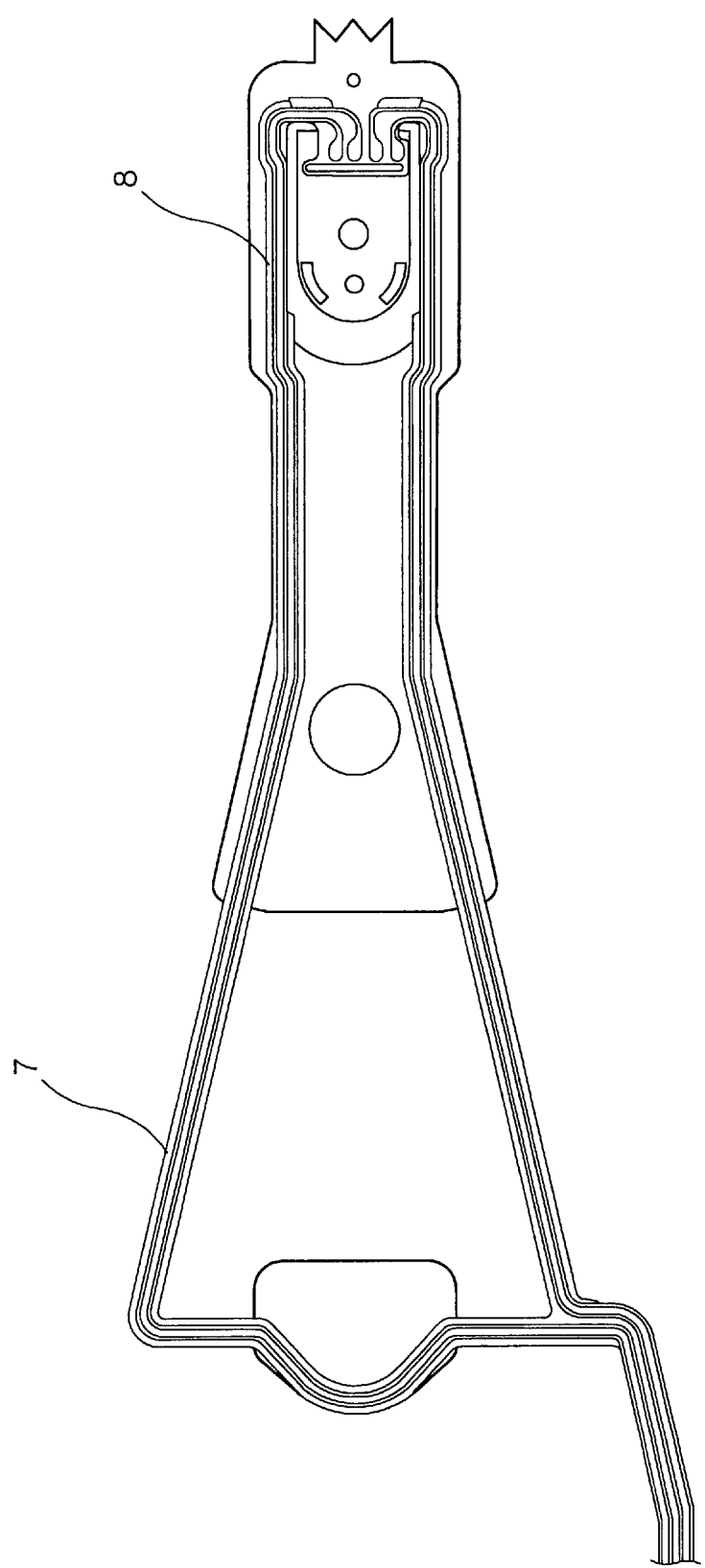
FIG. 3 is an explanatory drawing showing a wiring pattern serving as current control means of the magnetic recording device shown in FIG. 1.

Moreover, reference numeral 4 denotes a solenoid, which is wound around the hard magnetic film 3 near the magnetic resistance film 1 and adjusts a magnetic field generated by applied current from the hard magnetic film 3. Reference numeral 5 denotes a current generating circuit, which generates current applied to the solenoid 4 and is disposed in a preamplifier 6 (or near the preamplifier 6). Additionally, reference numeral 7 denotes a wiring pattern which controls current applied from the current generating circuit 5 to the solenoid 4 and is placed as shown in FIG. 3 on an FPC (flexible wiring board) 8, which is placed on the suspension C such as a plate spring.

In such a magnetic recording device, when the reproducing head B changes in longitudinal bias magnetization ratio, a magnetic field response curve is varied accordingly. A longitudinal bias magnetization ratio is an index which indicates a degree of a thickness of the above magnetic domain control film and is a value computed by dividing a saturation magnetic flux density (Bs3) and a film thickness (t3) of the hard magnetic film 3 by a saturation magnetic flux density (Bs1) and a film thickness (t1) of the MR film 1. Therefore, the larger a longitudinal bias magnetization ratio, the stronger the hard magnetic film 3, which serves as a magnetic domain control film.

Figure 4:
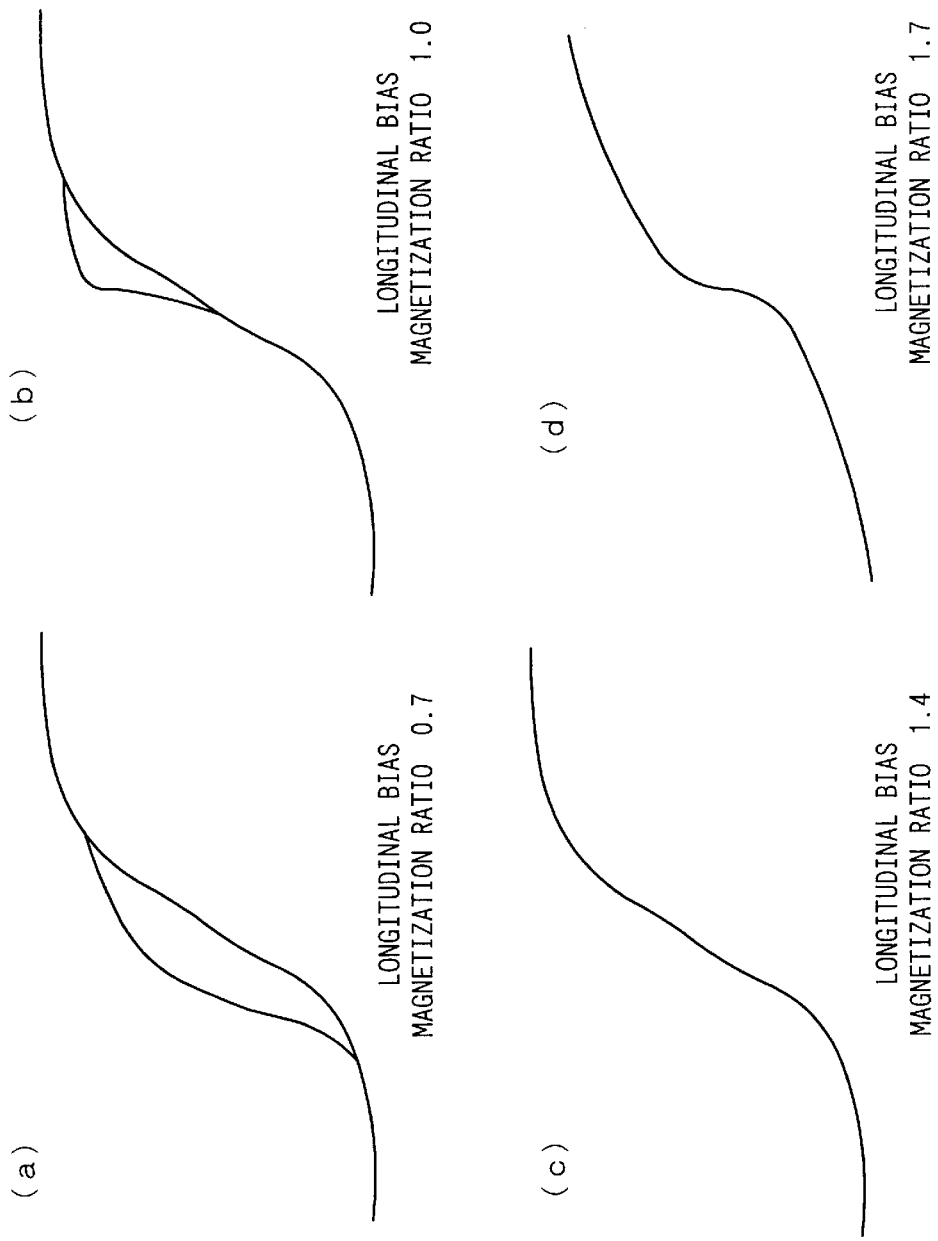
FIGS 4(a–d) are characteristic diagrams showing a magnetization response curve when a longitudinal bias curve varies on the reproducing head shown in FIG. 2.

FIG. 4 shows a magnetic field response curve relative to a variety of longitudinal bias magnetization ratios. An axis of ordinates represents an output voltage and an axis of abscissas represents a magnetic field applied from the outside. As shown in FIGS. 4(a) and 4(b), it is found that in the case of a small longitudinal bias magnetization ratio such as 0.7 and 1.0, an abnormal part appears on hysteresis of a loop and Barkhausen noise occurs. Meanwhile, as shown in FIGS. 4(c) and 4(d), in the case of a large longitudinal bias magnetization ratio such as 1.4 and 1.7, improvement is made such that Barkhausen noise is eliminated. In this case, it is understood that single magnetic domains are formed on the magnetic resistance film 1.

However, the larger a longitudinal bias magnetization ratio, the gentler the inclination of a slope on the magnetic field response curve. When a longitudinal bias magnetization ratio is too large, a sensitivity of an element is deteriorated and a reproducing waveform is smaller and less sharp. This is because the movement of a magnetic substance of the magnetic resistance film 1 is restrained by a magnetic field produced in a TPI direction (in a radius direction of the recording medium) by the hard magnetic film 3, which serves as a magnetic domain control film.

Thus, since current is applied to the solenoid 4, a magnetic flux is produced in a longitudinal direction of the hard magnetic film 3 and a longitudinal bias magnetic field is adjusted. Consequently, preferable response is obtained for a magnetic field without the occurrence of Barkhausen noise. Since the direction of current applied to the solenoid 4 is made reversible, it is possible to increase and decrease a longitudinal bias magnetic field.

Hence, even when the hard magnetic film 3, which is formed in a process of manufacturing a head, is shifted in size or is irregular in magnetic strength, it is possible to bring the reproducing head B to a stable operating point by adjusting a magnetic field produced in a longitudinal bias direction by means of current applied to the solenoid 4.

Embodiment 2

Figure 5:
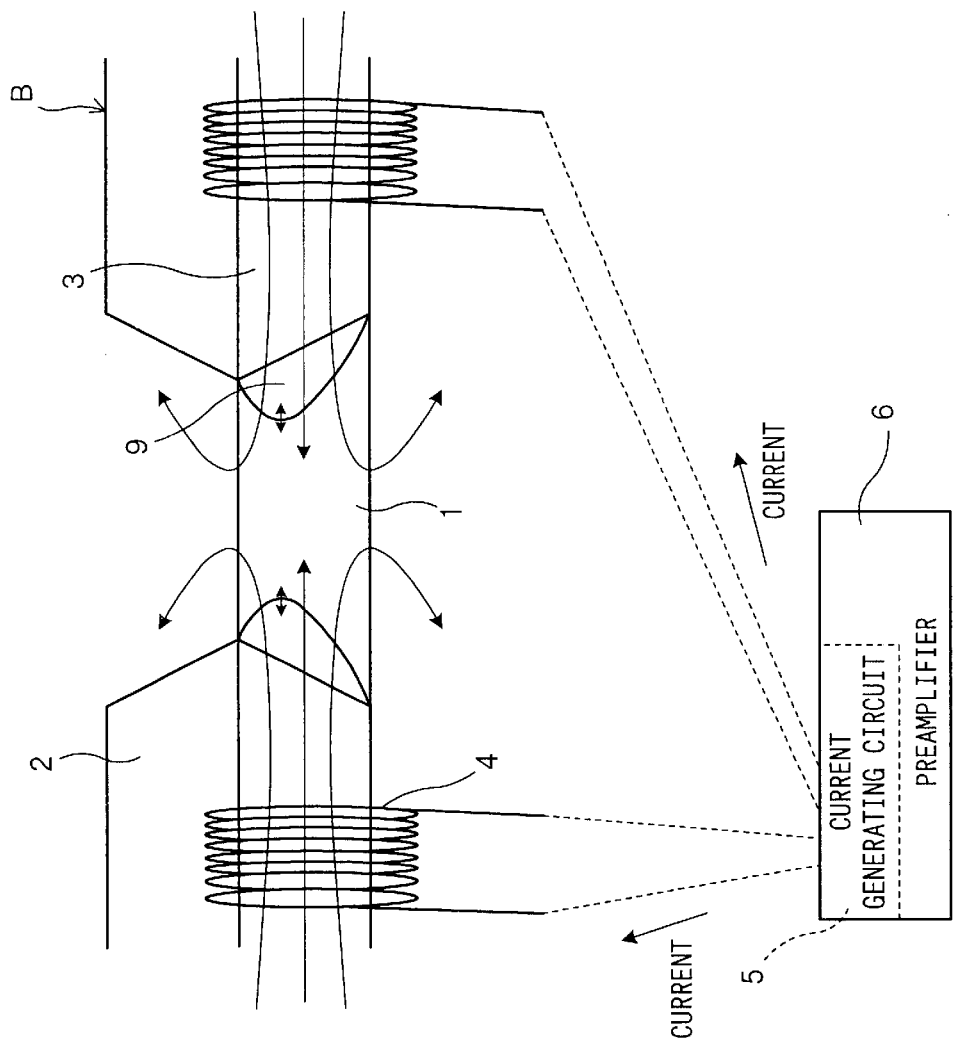
FIG. 5 is a structural drawing showing a reproducing head constituting a magnetic recording device according to Embodiment 2 of the present invention.

FIG. 5 shows a configuration of a magnetic sensing part of a reproducing head of a magnetic recording device according to Embodiment 2 of the present invention. Since the reproducing head is identical in configuration to the reproducing head of the magnetic recording device described in the above Embodiment 1, the members having the same functions are indicated by the same reference numerals as FIG. 2 and the description thereof is omitted. Refer to FIGS. 1 and 3 for the members other than the reproducing head.

Additionally, the wiring pattern 7 includes a measuring section for measuring an effective track width (detailed later) of the reproducing head B, a computing and determining section for computing a difference between a design value and a measured value measured by the measuring section and determining an optimum current value applied to the solenoid, and a current adjusting section for adjusting current applied to the solenoid to obtain a current value determined in the computing and determining section.

As shown in FIG. 5, a magnetic resistance film 1 in the vicinity of the hard magnetic film 3 actually includes a reproducing film inert region 9, which cannot function as a reproducing sensor because of the influence of magnetism from the hard magnetic film 3 (a spindle film in some cases). An effective track width is narrowed because the reproducing film inert region 9 cannot function as a sensor.

For this reason, the following operation is suitably performed by using the wiring pattern 7 to bring an effective track value to a design value. Namely, an effective track width of the reproducing head B is measured by the measuring section, a difference between a measured value and a design value is computed by the computing and determining section to determine an optimum current value, and current is adjusted by the current adjusting section to obtain a determined current value.

Namely, when an effective track width needs to be smaller, current is applied to the solenoid 4 to increase the reproducing film inert region 9. When an effective track width needs to be larger, reverse current is applied to the solenoid 4 to decrease the reproducing film inert region 9.

The above operation makes it possible to modify an effective track width close to a design value. An effective track width is varied due to dispersions in size or the like caused during manufacturing and due to the influence of a skew angle, a head flying height or the like.

Embodiment 3

In order to bring an effective track width to a design value on the reproducing head of the magnetic recording device described in the above Embodiment 2, the following operations are performed in a process of shipping the reproducing head to a factory. The members including the reproducing head are indicated by the same reference numerals as Embodiment 2.

Figure 6:
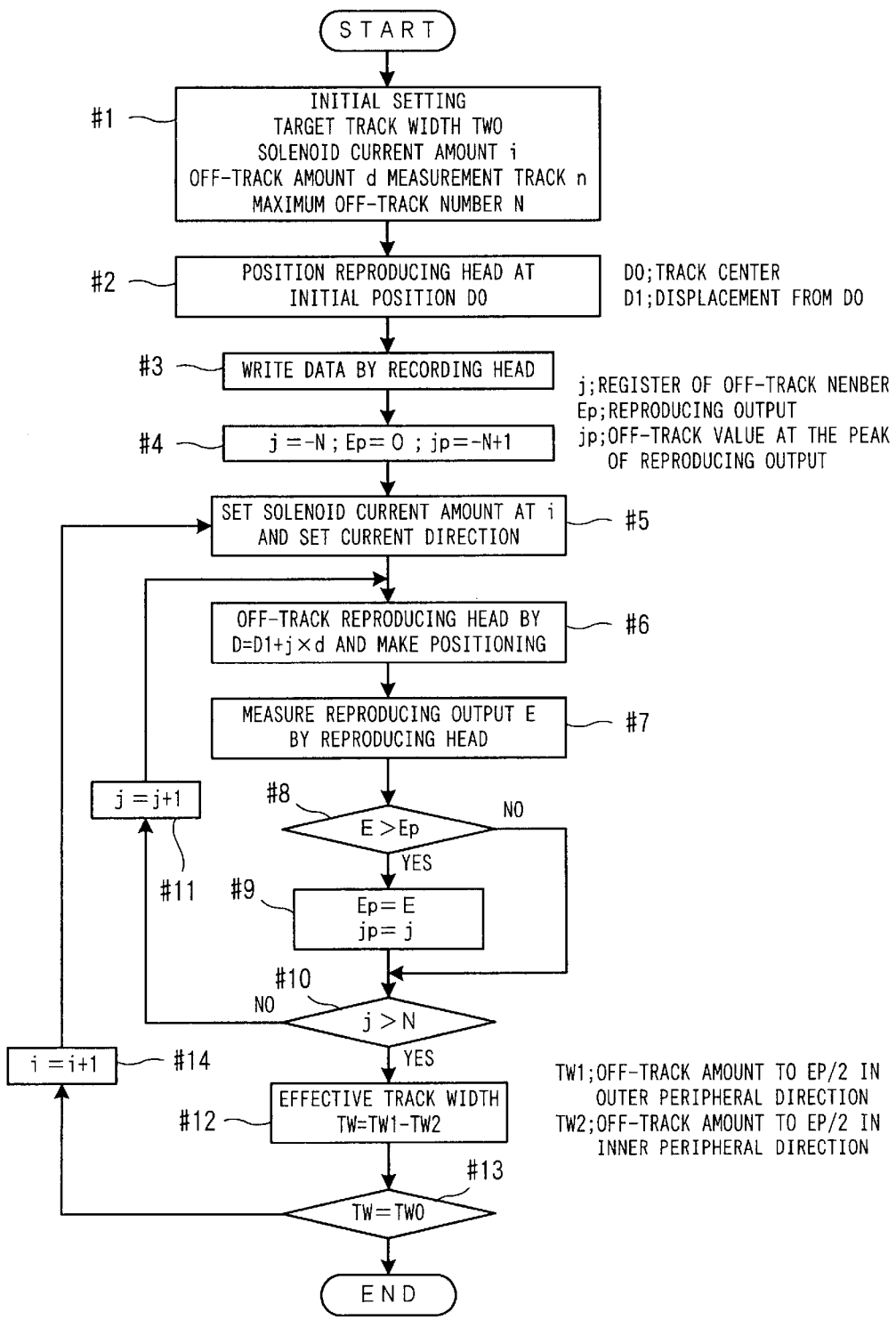
FIG. 6 is a flowchart for explaining a change in effective track width of a magnetic recording device according to Embodiment 3 of the present invention.

As shown in a flowchart of FIG. 6, in #1, initial settings are made on a target track width TWO, a solenoid current amount i, an off-track amount d, a maximum off-track number N, and a measured track n.

In #2, for each track of a magnetic recording medium A, a reproducing head reads an A burst and a B burst, which have been written by a servo track writer in advance, comparison is made on outputs of the A burst and the B burst, and a track center D0 is set at a point where the outputs are equal. FIGS. 7(a) and 7(b) show waveforms, which are formed when servo information is read by the reproducing head.

And then, in #3, measurement data is written using a recording head at a position of the track center D0. At this moment, a 2T pattern is used for a servo frequency. For example, in the case of a 60-MHz servo frequency, a repetitive pattern of 15 MHz is written.

In #4, a register of an off-track number is set at j=−N, a reproducing output is set at Ep=0, and an off-track value at the peak of a reproducing output is set at jp=−N+1. Further, a current direction of the solenoid current amount i is set in #5.

Subsequently, in #6, a reproducing head B opposing the magnetic recording medium A is off-tracked by a distance d from the track center D0 in a TPI direction (radius direction of the recording medium), and positioning is made at a position D=D1 (writing position of measurement data, i.e., displacement from the track center D0)+j×d. In #7, a reproducing output E of the measurement data is measured at the position D. Here, since the measurement data is written at the track center in the present embodiment, D1=0 is obtained.

Next, in #8, the measured reproducing output E is compared with a reproducing output Ep=0, which is a set value. In the case where the measured value is larger than the set value, the reproducing output E is stored as a set value Ep of the reproducing output in #9, and an off-track value jp at this moment is stored as a set value j of an off-track number. In the case where a measured value of a reproducing output is smaller than the set value, an initial set value is maintained.

Subsequently, in #10, the set value j and the track number N are compared with each other. In the case where the set value j is smaller, the set value j is increased only by 1 in #11, and then the operations of #6 and later are carried out.

In the case where the set value j is larger, in #12, a maximum reproducing output EP is detected when a reproducing output E is at the peak as shown in FIG. 8. An off-track amount TW1 in an outer peripheral direction and an off-track amount TW2 in an inner peripheral direction are detected. The off-track amount TW1 corresponds to a reproducing output EP/2, which is 50% of the maximum reproducing output point EP. And computation is made on an effective track width TW, which is defined as a distance between the off-track amounts TW1 and TW2.

And then, in #13, determination is made if the effective track width TW is equal to a track width TW0 which is desirable on design. When the effective track width is not equal, a solenoid current amount i is changed in #14, and the operations of #5 and later are carried out.

At a current amount having an effective track width TW equal to the track width TW0, which is desirable on design, the operations are completed.

As mentioned earlier, it is possible to find an optimum amount of current applied to the solenoid 4 corresponding to each track of the magnetic recording medium A.

Additionally, an actual amount of current applied to the solenoid 4 may be determined for each track of the magnetic recording medium A according to a current amount obtained in the above manner. Or an amount current may be determined for each track group, which is composed of a plurality of tracks arranged in order from an outer region to an inner region of the magnetic recording medium A.

Meanwhile, in the magnetic recording medium A, executing means such as a program is placed in a memory in front of each data region. The executing means carries out the flow of computing an amount of current applied to the solenoid 4 in the above manner.

With this arrangement, the executing means is read every time the reproducing head B shifts to a desired data region of the magnetic recording medium A. Current of the solenoid 4 is adjusted and an effective track width TW is brought close a design value.

What is claimed is:

1. A magnetic recording device comprising a magnetic head using a hard bias system and a magnetic resistance film, said head having a hard bias film for adding a magnetic field to the magnetic resistance film in a longitudinal bias direction and for controlling a magnetic domain on the magnetic resistance film, wherein
    said hard bias film includes a solenoid for adjusting the magnetic field running in a longitudinal bias direction.

2. The magnetic recording device according to claim 1, further comprising a current generating circuit near said magnetic head to generate longitudinal bias current supplied to said solenoid.

3. The magnetic recording device according to claim 1, further comprising a current control means, wherein said current control means is for controlling longitudinal bias current supplied to said solenoid, and includes a wiring pattern placed on a suspension of said magnetic head.

4. The magnetic recording device according to claim 3, wherein said current control means for controlling longitudinal bias current supplied to said solenoid comprises:
    a measuring section for measuring an effective track width of said magnetic head;
    a computing and determining section which computes a difference between a measured value measured by the measuring section and a design value, and determines a current value based on the computation result; and
    a current adjusting section for adjusting current supplied to said solenoid in such a manner as to obtain a current value determined by said computing and determining section.

5. The magnetic recording device according to claim 1, wherein said magnetic resistance film has two ends, and said hard bias film is located at each end of said magnetic resistance film for adding a magnetic field to the magnetic resistance film in a longitudinal bias direction and for controlling a magnetic domain on said magnetic resistance film.

6. The magnetic recording device according to claim 5, further comprising a current generating circuit, wherein said solenoid comprises first and second solenoids each located at one of said two ends of the magnetic resistance film and connected to the current generating circuit.

7. A method of adjusting a magnetic head of a hard bias system having a hard bias film for adding a magnetic field to a magnetic resistance film in a longitudinal bias direction and for controlling a magnetic domain on the magnetic resistance film, comprising:
    controlling current supplied to a solenoid provided on said hard bias film for improving linear responsiveness of a reproducing output of said magnetic head by means of a magnetic field appearing on said solenoid.

8. A method of adjusting a magnetic head of a hard bias system having a hard bias film for adding a magnetic field to a magnetic resistance film in a longitudinal bias direction and for controlling a magnetic domain, comprising:
    controlling current supplied to a solenoid provided on said hard bias film for increasing or decreasing a reproducing inert region of said magnetic head by means of a magnetic field appearing on said solenoid, and varying an effective track width;
    measuring by measuring means said effective track width of said magnetic head;
    determining a value of current supplied to said solenoid by computing and determining means based on a measured value measured thereby and a design value; and
    controlling the current by current adjusting means to obtain the determined current value.

* * * * *